United States Patent
Gondek et al.

(10) Patent No.: US 7,424,164 B2
(45) Date of Patent: Sep. 9, 2008

(54) PROCESSING A DETECTED EYE OF AN IMAGE TO PROVIDE VISUAL ENHANCEMENT

(75) Inventors: Jay Gondek, Camas, WA (US); Morgan Schramm, Portland, OR (US); Thomas G. Berge, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 10/420,160

(22) Filed: Apr. 21, 2003

(65) Prior Publication Data

US 2004/0208387 A1    Oct. 21, 2004

(51) Int. Cl.
    *G06K 9/40*    (2006.01)
(52) U.S. Cl. .............. 382/254; 382/118; 382/167; 348/557
(58) Field of Classification Search ........... 382/261, 382/264, 118, 254, 225, 274, 130, 167; 359/371, 359/386; 463/31; 358/1.9, 524; 345/419, 345/8, 545; 348/252, 241, 606, 557
See application file for complete search history.

(56) References Cited

U.S. PATENT DOCUMENTS

| 4,825,297 | A | * | 4/1989 | Fuchsberger et al. ........ 358/447 |
| 5,748,178 | A | * | 5/1998 | Drewry ...................... 345/643 |
| 5,748,764 | A |   | 5/1998 | Benati et al. |
| 6,111,607 | A | * | 8/2000 | Kameyama ................. 348/256 |
| 6,798,903 | B2 |  | 9/2004 | Takaoka |
| 6,980,691 | B2 | * | 12/2005 | Nesterov et al. ............ 382/165 |
| 7,039,222 | B2 | * | 5/2006 | Simon et al. ................ 382/118 |
| 2001/0022853 | A1 | * | 9/2001 | Takaoka ...................... 382/167 |

FOREIGN PATENT DOCUMENTS

| EP | 1223551 | 7/2002 |
| EP | 1318475 | 4/2005 |
| JP | 10233929 A | 9/1998 |
| JP | 2000076427 A | 3/2000 |

OTHER PUBLICATIONS

Henry A. Rowley et al., "Neural Network-Based Face Detection", IEEE. pattern analysis and machine intelligence, vol. 20, No. 1, Jan. 1998.*
Rowley, Henry A. et al., "Neural Network-Based Face Detection," IEEE Transactions on Pattern Analysis and Machine Intelligence, vol. 20, No. 1, Jan. 1998, pp. 23-38.
Viola, Paul et al., "Rapid Object Detection using a Boosted Cascade of Simple Features," IEEE, Dec. 8, 2001, pp. 511-518.
European Search Report dated Dec. 29, 2005.

* cited by examiner

*Primary Examiner*—Sheela C Chawan (57) ABSTRACT

A method for processing a detected eye of an image to provide visual enhancement. The method includes determining whether an eye exists within an image. The eye includes an eye color. If the eye exists within the image, the method also includes determining the location of the eye within the image. Furthermore, the method includes processing the eye to provide visual enhancement to the eye without substantially changing the hue of the eye color of the eye.

35 Claims, 8 Drawing Sheets

PROCESSING A DETECTED EYE OF AN IMAGE TO PROVIDE VISUAL ENHANCEMENT

BACKGROUND

Computers may be utilized to process and subsequently print out digital images. Generally, a computer may receive one or more digital images, for example, from another computer, a digital camera or an image scanner. Once the digital image is received, a computer user may desire to have it printed out on some type of paper. As such, the user causes an application operating on the computer to transfer the data associated with the desired image to a print driver that also operates on the computer. The print driver software may then process the digital image data in order to convert it into an acceptable format for the printer associated with the printer driver. Subsequently, the printer driver transfers the formatted image data to the printer which eventually prints the image onto one or more pieces of paper for the user.

It should be appreciated that there is a continuing desire within the printer industry to enable printer drivers to produce more pleasing or attractive renditions of human facial regions location within images.

For these and other reasons, there is a need for the present invention.

SUMMARY OF THE INVENTION

A method for processing a detected eye of an image to provide visual enhancement. The method includes determining whether an eye exists within an image. The eye includes an eye color. If the eye exists within the image, the method also includes determining the location of the eye within the image. Furthermore, the method includes processing the eye to provide visual enhancement to the eye without substantially changing the hue of the eye color of the eye.

DESCRIPTION OF THE PREFERRED EMBODIMENTS

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "determining", "processing", "performing", "deciding", "ascertaining", "transmitting", "receiving", "increasing", "decreasing", "providing", "recognizing", "generating", "utilizing", "storing" or the like, refer to the action and processes of a computing system, or similar electronic computing device, that manipulates and transforms data. The data is represented as physical (electronic) quantities within the computing system's registers and memories and is transformed into other data similarly represented as physical quantities within the computing system memories or registers or other such information storage, transmission, or display devices.

Exemplary Operations in Accordance with the Present Invention

Figure 1:
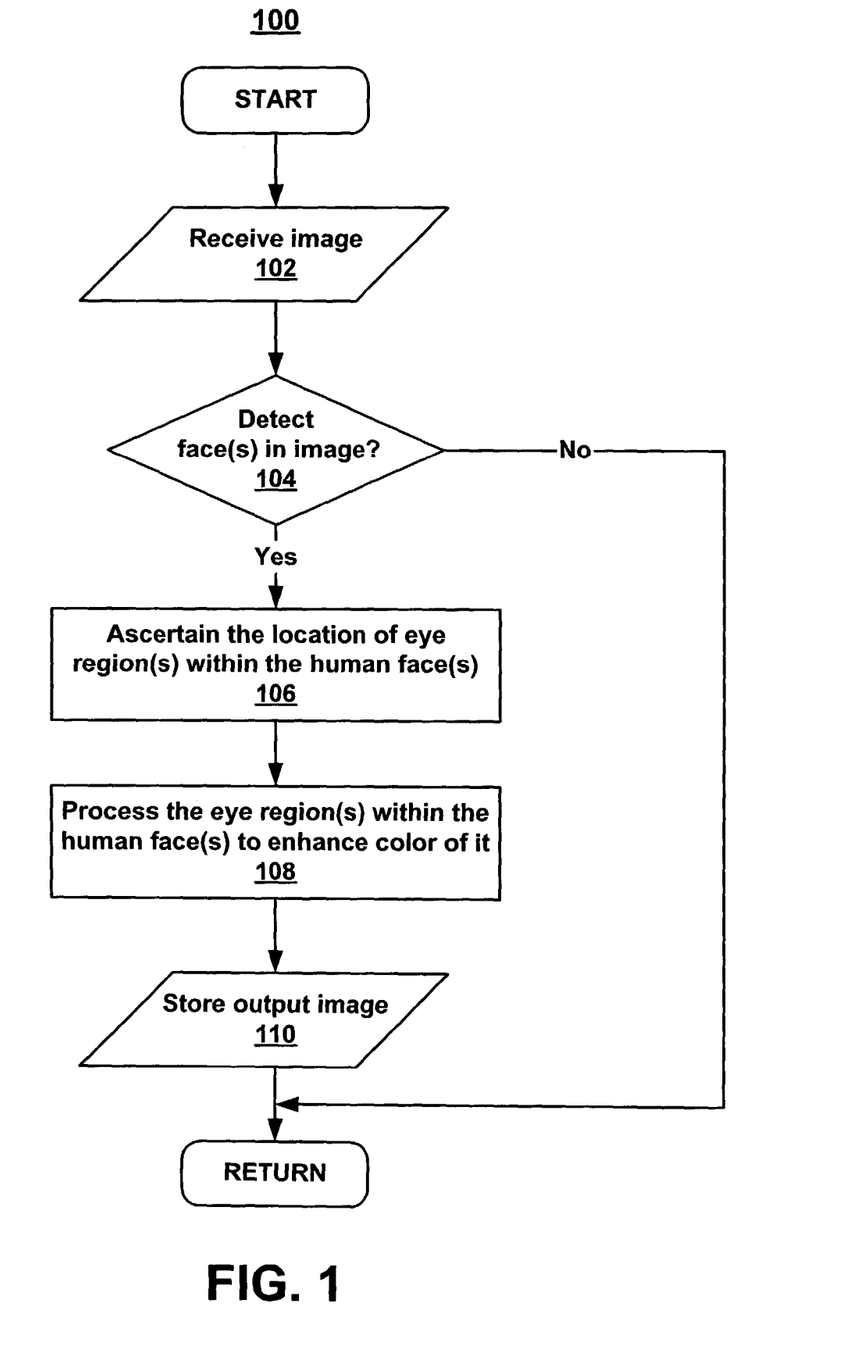
FIG. 1 is a flowchart of steps performed in accordance with an embodiment of the present invention for processing one or more human eye regions of an image to provide color enhancement.

FIG. 1 is a flowchart 100 of steps performed in accordance with an embodiment of the present invention for processing one or more detected human eye regions of an image to provide color enhancement. Flowchart 100 includes processes which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 100, such steps are exemplary. That is, the present embodiment is well suited to performing various other steps or variations of the steps recited in FIG. 1. Within the present embodiment, it should be appreciated that the steps of flowchart 100 may be performed by software, by hardware or by any combination of software and hardware.

The present embodiment provides a method for processing one or more detected human eye regions of an image in order to enhance their color thereby providing a more pleasing and/or attractive facial region(s). For example, when an image is received, a determination is made as to whether any human face exists within the image. If not, the present embodiment is exited. However, if there is one or more human faces present within the image, the image is then processed by the present embodiment. Specifically, each region that defines a human eye within the image is processed in order to provide color enhancement to the eye. In this fashion, any human eye within the image may be specifically handled in a manner that provides a more pleasing or attractive rendition of the human facial region. It is noted that this method may be performed automatically.

At step 102 of FIG. 1, an image (e.g., a digital image) is received in order to be processed by flowchart 100. It is noted that there are a wide variety of reasons for receiving an image at step 102 to be processed. For example, the image may be received at step 102 in order to subsequently view it on a display device or for it to be printed out by a printer, just to name a few. Furthermore, the image may be received at step 102 in diverse ways in accordance with the present embodiment. For example, the image may be received from an image scanner and/or a digital camera coupled to a computing device. Additionally, the image may be received at step 102 by software and/or hardware associated with a printer (e.g., printer driver), digital camera, image scanner, computer or any other image processing system. The flowchart 100 is capable of operating with any image processing system.

In step 104, the present embodiment determines whether a human face(s) is present within the received image. If it is determined that there are not any human faces present within the image, the present embodiment exits flowchart 100. However, if it is determined that there is one or more human faces present within the image, the present embodiment proceeds to step 106. It is understood that step 104 may be implemented in diverse ways. For example, a Neural Network-Base Face Detection algorithm, the Jones Viola Algorithm, and/or any other face detection technique may be utilized in order to perform the functionality of step 104.

In step 106 at FIG. 1, the location of the eye region(s) are ascertained within the detected human faces of the image. The location of the human eye region(s) may be contained within or defined by a mask, a bounding box or some type of defined eye region at step 106. It is understood that the determination of the eye location region(s) of the image at step 106 may be implemented in a wide variety of ways. For example, any eye location technique may be utilized in order to perform the functionality of step 106. Additionally, some face detection techniques, such as, the Jones Viola Algorithm and/or a Neural Network-Base Face Detection algorithm may be implemented to ascertain the location of one or more eyes within the image at step 106. It should be appreciated that the location of any eyes within the image is utilized to define the portion of the image to process at step 108.

At step 108, the location(s) defining the human eye region(s) within the image, or some portion of the human eye region(s), is utilized to process the human eye(s) in order to enhance its color (or their color). It is understood that one of the functions of step 108 is to provide an overall more pleasing and/or attractive rendition of the human facial region(s) within the image. The color enhancement of the defined eye region(s) at step 108 may be implemented in a wide variety of ways. For example, the chroma or colorfulness or saturation within the defined eye region(s) may be increased at step 108 in order to enhance the color of the eye region(s) of the image. Alternatively, the lightness within the defined eye region(s) may be increased at step 108 in order to provide color enhancement to the eye region(s). Within another embodiment, both the chroma (or saturation) and lightness within the eye region(s) may be increased at step 108 to provide enhanced color to the eye region(s) of the image. It should be appreciated that any color enhancement technique may be implemented at step 108 in order to process the defined eye region(s) of the image. It is noted that at least some portion, perhaps not all, of the human eye region(s) of the image may be subjected to the functionality of step 108.

It is noted that the terms associated with color such as chroma, lightness, colorfulness, hue, saturation, and the like are well defined in a wide variety of references. For example, the book entitled "Computer Graphics: Principles and Practice (Second Edition in C)" by Foley, van Dam, Feiner and Hughes, 1995, is one exemplary reference that defines the terms associated with color.

In step 110 at FIG. 1, the data associated with the resulting output image may be stored utilized any type of memory device. It is appreciated that the memory device utilized at step 110 may include, but is not limited to, random access memory (RAM), static RAM, dynamic RAM, read only memory (ROM), programmable ROM, flash memory, EPROM, EEPROM, disk drive (e.g., hard disk drive), diskette, magnetic or optical disk (e.g., CD, DVD, and the like). It is noted that once the output image is stored, it may be utilized for other functions such as being printed out by a printer (e.g., 608 of FIG. 6), displayed on a display device (e.g., 612 of FIGS. 6 and 7), and the like. Once step 110 is completed, the present embodiment exits flowchart 100.

It is noted that flowchart 100 is well suited to operate with other types of eyes beside human eyes. For example, flowchart 100 may be modified to operate with any type of eyes within an image such as, but not limited to, dog eyes, cat eyes, and/or any other type of eye that may be detected within the image. Alternatively, it is noted that flowchart 100 may be modified to receive and process a black and white image in a manner similar to that described herein. For example, the lightness of the eye region(s) may be increased at step 108.

Figure 2A:
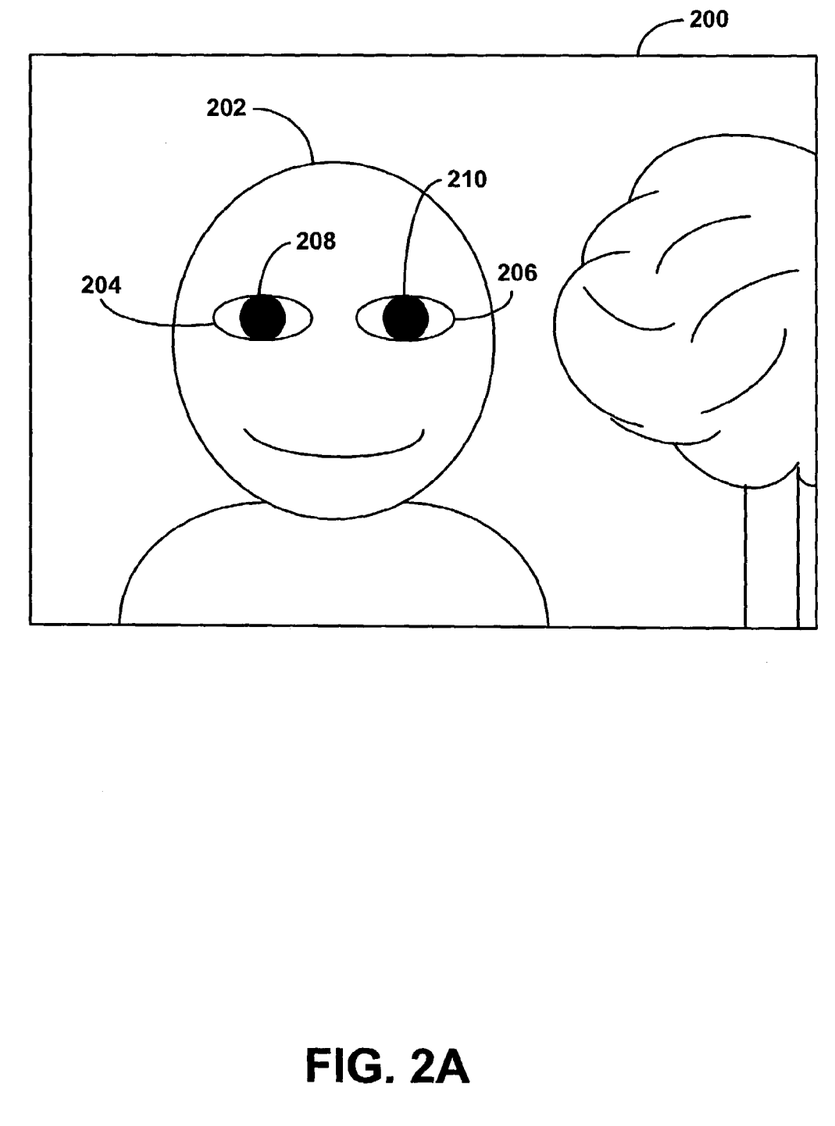
FIG. 2A is a diagram illustrating an exemplary image that may be received for processing in accordance with an embodiment of the present invention.

FIG. 2A is a diagram illustrating an exemplary image 200 (e.g., photograph, picture, digital image, etc.) that may be received for processing in accordance with an embodiment of the present invention. For example, image 200 may be received from an image scanner or a digital camera coupled to a computer. As such, image 200 may then be processed by an embodiment (e.g., flowchart 100, flowchart 300 or flowchart 400) of the present invention for it to be, for example, printed out by a printer or shown on a display device. It is noted that image 200 includes a tree along with a person having a facial region 202. Additionally, the facial region 202 of the person includes eye regions 204 and 206 that include iris eye color represented as solid circles 208 and 210, respectively.

Figure 2B:
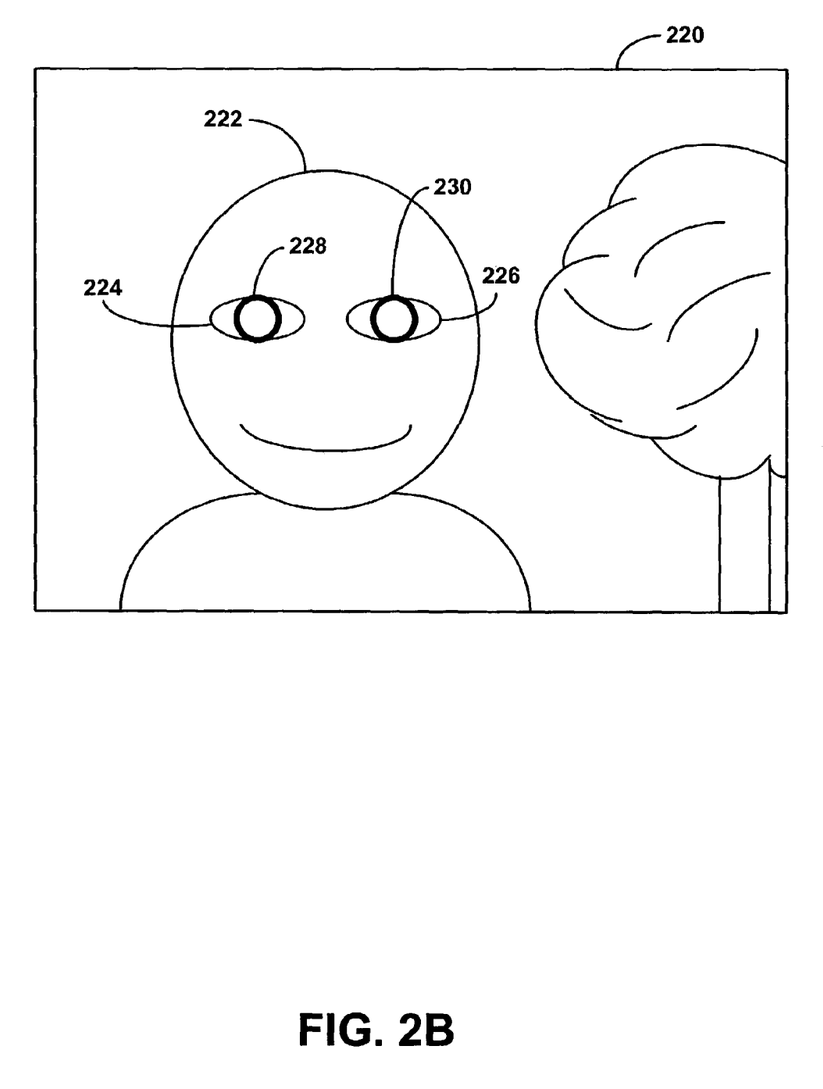
FIG. 2B is a diagram illustrating the positive effects of processing the image of FIG. 2A in accordance with an embodiment of the present invention.

FIG. 2B is a diagram illustrating the positive effects of processing the image 200 of FIG. 2A in accordance with an embodiment of the present invention. Specifically, image 220 of FIG. 2B represents a reproduction of image 200 after being processed by an embodiment in accordance with the present invention (e.g., flowchart 100, flowchart 300 or flowchart 400). As shown, when the data associated with the human eye regions 204 and 206 are processed in order to provide color enhancement within them, a more pleasing and/or attractive rendition of the human facial region 222 results within image 220. For example, the eye regions 224 and 226 include enhanced iris eye color represented by circles 228 and 230, respectively, which provide a more attractive or pleasing rendition of human facial region 222 to its viewer. In this manner, facial region 222 is visually improved without negatively modifying its facial tones or any other aspects of image 220.

Figure 3:
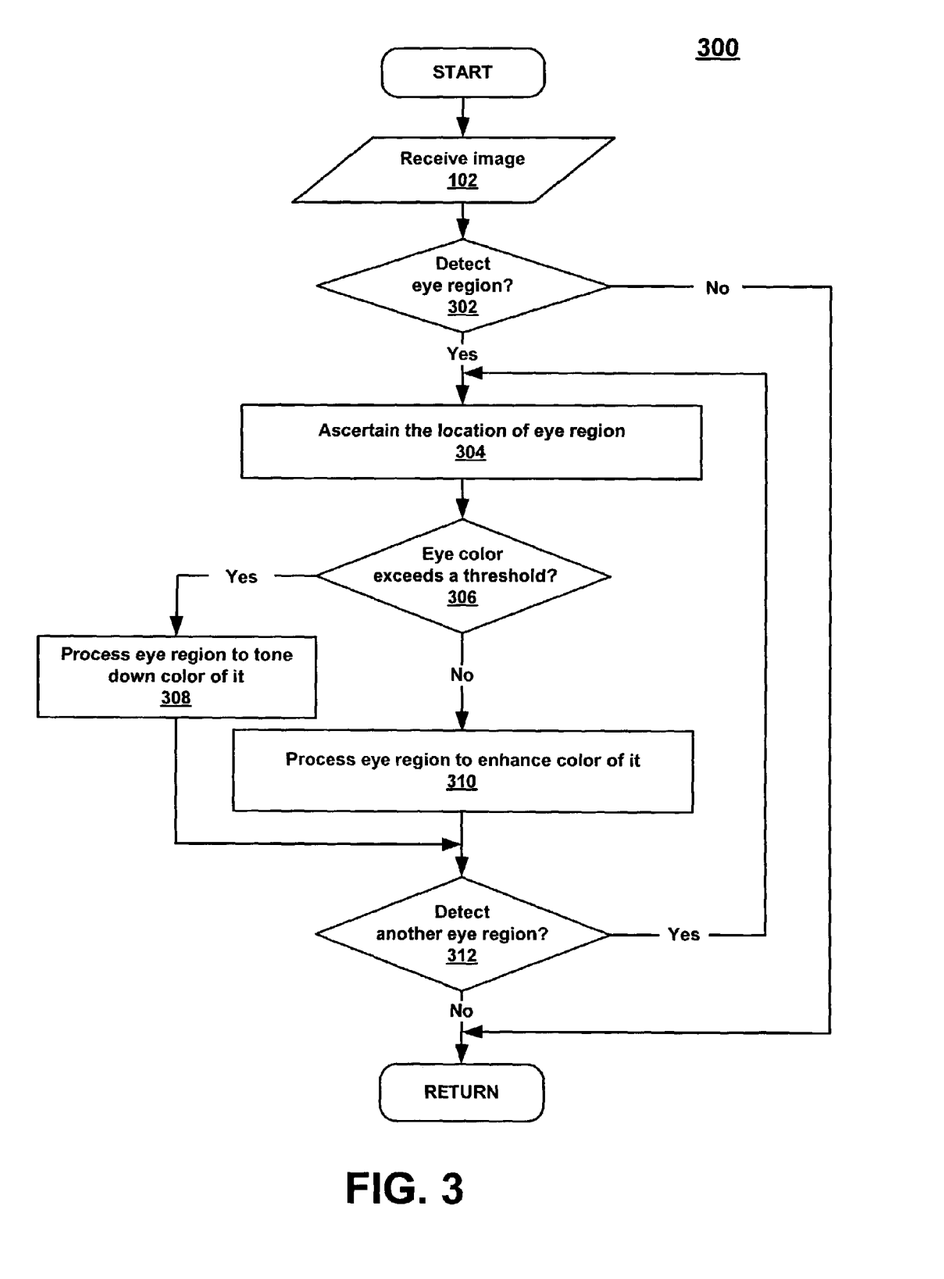
FIG. 3 is a flowchart of steps performed in accordance with another embodiment of the present invention for processing one or more eye regions of an image to provide color enhancement.

FIG. 3 is a flowchart 300 of steps performed in accordance with an embodiment of the present invention for processing one or more detected eye regions of an image to provide color enhancement. Flowchart 300 includes processes of the present invention which, in one embodiment, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 300, such steps are exemplary. That is, the present embodiment is well suited to performing various other steps or variations of the steps recited in FIG. 3. Within the present embodiment, it should be appreciated that the steps of flowchart 300 may be performed by software, by hardware or by any combination of software and hardware.

The present embodiment provides a method for processing one or more human eye regions of an image to provide color enhancement resulting in a more attractive or pleasing rendition of the facial region(s). For example, when an image is received, a determination is made as to whether any human eye region exists within the image. If not, the present embodiment is exited. However, if there is one or more human eyes present within the image, the image is then processed by the present embodiment. Specifically, the eye location region is ascertained within the image. Next, a determination is made as to whether the eye color within the eye region exceeds a defined threshold. If so, the eye region is processed in a manner to soften or tone down the color within that eye region. Conversely, if the eye color does not exceed (or is less than or equal to) the threshold, the eye region is processed to provide color enhancement to that eye region. Subsequently, this process is repeated for each eye region located within the image. In this fashion, any human eye within the image may be handled in a manner that provides a more pleasing and/or attractive rendition of the human facial region. It is noted that this method may be performed automatically.

At step 102 of FIG. 3, an image (e.g., digital) is received in order to be processed by flowchart 300. It is noted that there are a wide variety of reasons for receiving an image at step 102 to be processed. For example, the image may be received at step 102 in order to subsequently view it on a display device or for it to be printed out by a printer, just to name a few. Additionally, the image may be received at step 102 in diverse ways in accordance with the present embodiment. For example, the image may be received from a digital camera and/or an image scanner coupled to a computing device. Additionally, the data associated with the image may be received at step 102 by software and/or hardware associated with a printer (e.g., printer driver), digital camera, scanner, computer or any other image processing system. The flowchart 300 is capable of operating with any image processing system.

In step 302, the present embodiment determines whether a human eye region is located within the received image. If there is not any human eye region present within the image, the present embodiment exits flowchart 300. However, if there is a human eye region present within the image, the present embodiment proceeds to step 304. It is noted that any eye detection technique may be utilized to implement step 302.

At step 304 at FIG. 3, the eye region location is ascertained (or determined) within the image. The location of the human eye region may be contained within (or defined by) a mask, a bounding box or some type of defined eye region at step 304. It is appreciated that the determination of the eye location region within the image at step 304 may be implemented in diverse ways. For example, any eye location technique may be utilized in order to perform the functionality of step 304. Furthermore, some face detection techniques, such as, a Neural Network-Base Face Detection algorithm and/or the Jones Viola Algorithm may be implemented to ascertain the location of the eye region within the image at step 304. It is understood that the location of the eye region within the image is utilized to define the portion of the image to process at step 308 or step 310.

In step 306, it is determined whether the eye color contained within the defined eye region exceeds a defined threshold value. If the eye color does not exceed (or is less than or equal to) the defined threshold value, the present embodiment proceeds to step 310. However, if the eye color within the defined eye region exceeds the defined threshold value, the present embodiment proceeds to step 308. The functionality of step 306 may be performed in a wide variety of ways. For example, the threshold determination at step 306 may measure and compare the chroma level and/or the lightness level within the defined eye region with one or more defined threshold intensity values. It is noted that any type of color threshold determination may be implemented to perform the functionality of step 306. In this fashion, the present embodiment is able to process the eye region in a more specific manner resulting in a more attractive and/or pleasing rendition of the human facial region of the image.

It is noted that the step 306 may be modified such that a determination is made as to whether the eye color contained within the defined eye region is outside a threshold range. If the eye color is below the defined threshold range, the present embodiment may proceed to step 310. However, if the eye color of the defined eye region is beyond the threshold range, the present embodiment may proceed to step 308. And if the eye color is within the threshold range (not shown), the present embodiment may proceed to step 312.

At step 308 of FIG. 3, the location defining the human eye region within the image, or some portion of the human eye region, is utilized to process the human eye in order to tone down or subdue its color (e.g., without substantially changing the hue). The toning down or subduing of the color of the defined eye region at step 308 may be implemented in diverse ways. For example, the chroma, colorfulness and/or saturation within the defined eye region may be decreased at step 308 in order to tone down or soften the color of the eye region. Within another embodiment, the lightness within the defined eye region may be decreased at step 308 in order to subdue or soften the color of the eye region. Alternatively, both the chroma (or saturation) and lightness within the eye region may be decreased at step 308 to reduce or tone down the color of the eye region. It is understood that any color subduing, dimming, softening and/or reduction technique may be implemented at step 308 in order to tone down the color of the defined eye region of the image. It is appreciated that the above mentioned color toning down techniques of step 308 may be implemented without substantially changing the hue of the eye region color. It is noted that at least some portion, perhaps not all, of the human eye region of the image may be subjected to the functionality of step 308.

It is noted that step 308 may be modified such that nothing is done to subdue the color of the human eye. Therefore, at step 306, if the eye color within the defined eye region exceeds the defined threshold value, the eye color may remain unchanged at step 308. Alternatively, step 308 may be modified such that the amount of toning down of the color of the human eye is based on how far the color is from the threshold.

In step 310, the location defining the human eye region within the image, or some portion of the human eye region, is utilized to process the eye to enhance its color (e.g., without substantially changing the hue). The color enhancement of the defined eye region at step 310 may be implemented in a wide variety of ways. For example, the chroma, colorfulness, saturation and/or the lightness within the defined eye region may be increased at step 310 in order to enhance the color of the eye region of the image. Any color enhancement technique may be implemented at step 310 in order to process the defined eye region of the image. It is appreciated that the above mentioned enhancement techniques of step 310 may be implemented without substantially changing the hue of the eye region color. It is noted that at least some portion, perhaps not all, of the human eye region of the image may be subjected to the functionality of step 310.

It is understood that step 310 may be modified such that the amount of enhancement of the color of the human eye is based on how far the color is from the threshold.

At step 312 of FIG. 3, a determination is made as to whether another human eye region is present within the received image. If there is not any other human eye regions located within the image, the present embodiment exits flowchart 300. However, if these is another human eye region within the image, the present embodiment proceeds to the beginning of step 304. It is noted that any eye detection technique may be utilized to implement the functionality of step 312. In this manner, the present embodiment is able to process each eye region located within the image. Therefore, flowchart 300 is able to process any human eye within the image in a fashion that provides a more pleasing and/or attractive rendition of the human facial region(s).

Flowchart 300 is well suited to operate with other types of eyes beside human eyes. For example, flowchart 300 may be modified to operate with any type of eyes within an image such as, but not limited to, cat eyes, dog eyes, animal eyes and/or any other type of eye that may be detected within the image. Alternatively, it is noted that flowchart 300 may be modified to receive and process a black and white image in a manner similar to that described herein. For example, the lightness of the eye region may be increased at step 310 while the lightness of the eye region may be decreased (or alternatively left unchanged) at step 308.

Figure 4:
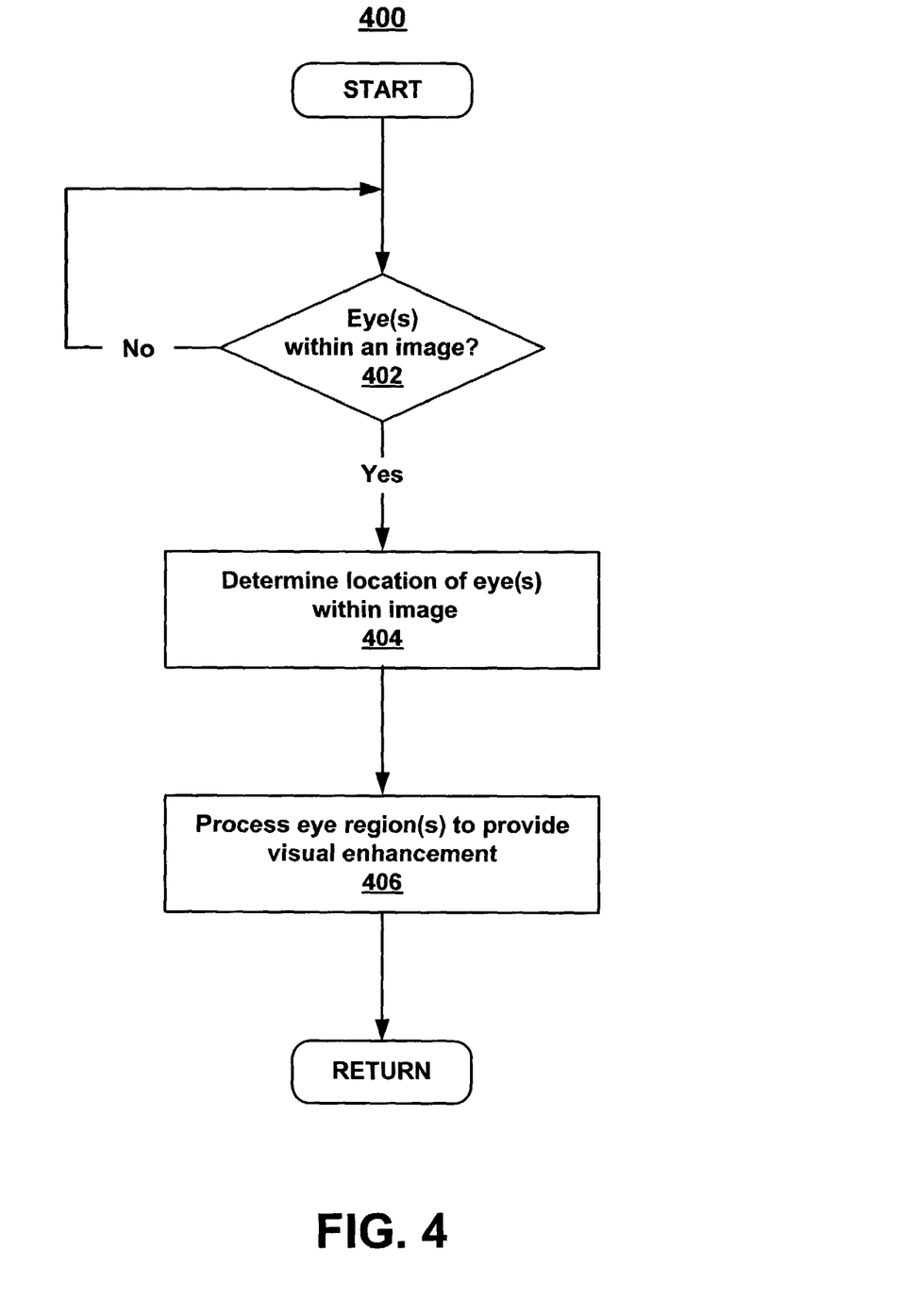
FIG. 4 is a flowchart of steps performed in accordance with yet another embodiment of the present invention for processing one or more eyes of an image to provide visual enhancement.

FIG. 4 is a flowchart 400 of steps performed in accordance with an embodiment of the present invention for processing one or more detected eyes of an image to provide visually enhancement. Flowchart 400 includes processes of the present invention which, in one embodiment, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 400, such steps are exemplary. That is, the present embodiment is well suited to performing various other steps or variations of the steps recited in FIG. 4. Within the present embodiment, it should be appreciated that the steps of flowchart 400 may be performed by software, by hardware or by any combination of software and hardware.

The present embodiment provides a method for processing one or more detected eyes of an image to provide visual enhancement to them. For example, a determination is made as to whether any eyes exist within an image. If there is one or more eyes present within the image, the location(s) of the eye(s) is determined. As such, a region(s) that defines an eye(s) within the image is processed in a manner to visually enhance it (or them). For example, the chroma and/or lightness of the eye region(s) within the image may be increased and/or decreased to visually enhance the iris color of the eye(s). Therefore, any eye within the image may be handled in a manner that provides a more pleasing rendition of the human facial region. It is noted that this method may be performed automatically.

It is understood that the functionality of flowcharts 400, 300 and 100 may be implemented with, but is not limited to, software and/or hardware associated with a printer (e.g., printer driver), digital camera, image scanner, computer or any other image processing system.

A step 402, the present embodiment determines whether there is one or more eyes within an image. If it is determined that there is not an eye within the image, the present embodiment proceeds to the beginning of step 402. However, if it is determined that there is an eye within the image, the present embodiment proceeds to step 404. It is appreciated that step 402 may be implemented in a wide variety of ways. For example, any eye detection technique may be utilized to perform the functionality at step 402. Additionally, some face detection techniques such as, but not limited to, the Jones Viola Algorithm or a Neural Network-Base Face Detection algorithm, may be utilized at step 402 to detect any human eyes within the image.

In step 404 of FIG. 4, the present embodiment determines the location(s), or position(s), of the eye(s) within the image. The location(s) of the eye(s) may be defined by and/or contained within a bounding box(es), a mask(s) or some type of defined eye region(s) at step 404. It is noted that at least some portion, perhaps not all, of the eye(s) within the image may be contained within a defined region(s) at step 404. It is understood that step 404 may be implemented in diverse ways. For example, any other eye location technique may be utilized to implement the functionality at step 404.

At step 406, the eye region(s) is processed in order to provide visual enhancement to it (or them). It is understood that step 406 may be performed in diverse ways. For example, the automatic processing at step 406 of the eye region(s) may include, but is not limited to, altering (e.g., increasing or decreasing) the chroma, colorfulness and/or saturation of the eye region(s) within the image, altering (e.g., increasing or decreasing) the lightness of the eye region(s), altering (e.g., increasing or decreasing) both the chroma and lightness of the eye region(s) of the image, and/or any other visual enhancement technique. Additionally, step 406 may involve processing the eye region(s) in order to provide visual enhancement to it (or them) without significantly changing the hue(s) of the eye color(s) of the eye region(s). It is understood that at least some portion, perhaps not all, of the eye region(s) of the image may be subjected to the functionality of step 406. Once step 406 is completed, the present embodiment exits flowchart 400.

It is noted that flowchart 400 is well suited to operate with any type of eyes. For example, flowchart 400 may operate with any type of eyes within an image such as, but not limited to, human eyes, animal eyes, and/or any other type of eye that may be detected within the image. Alternatively, it is noted that flowchart 400 may be modified to receive and process a black and white image in a manner similar to that described herein. For example, the lightness of the eye region(s) may be increased or decreased at step 406.

Figure 5:
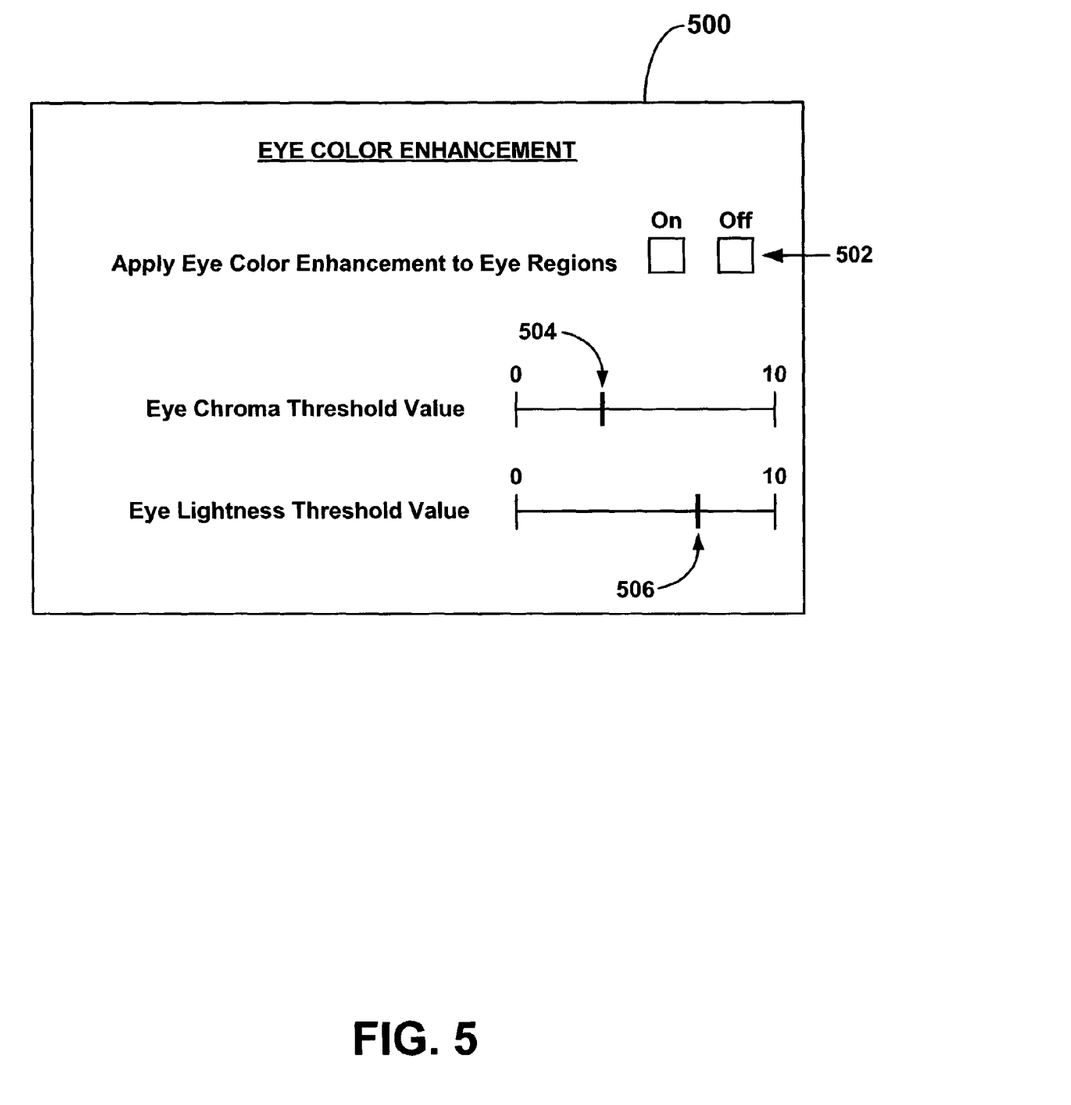
FIG. 5 is a diagram of an exemplary eye color enhancement dialog box that may be utilized in accordance with embodiments of the present invention.

FIG. 5 is a diagram of an exemplary eye color enhancement dialog box 500 that may be utilized in accordance with embodiments of the present invention. It is appreciated that the eye color enhancement dialog box 500 may be implemented as, but is not limited to, a graphical user interface (GUI). The eye color enhancement dialog box 500 may be utilized in conjunction with a method (e.g., flowchart 100, 300 and/or 400) for processing an eye region(s) of an image in order to enhance or modify its color.

Specifically, the eye color enhancement dialog box 500 enables a user to specifically tailor the thresholds associated with an eye color enhancement process performed to any eye regions that exist within an image. For example, the eye color enhancement dialog box 500 provides its user at line 502 the ability to turn on or off the application of eye color enhancement to eye regions of the image. Additionally, if the user chooses to have eye color enhancement applied to the eye regions by selecting the "On" box at line 502, the user is then able to adjust the parameters of specific threshold values associated with the eye color enhancement. For example, the user may utilize slider 504 in order to increase or decrease the chroma threshold value applied to the eye regions of the image. Furthermore, the user may utilize slider 506 in order to increase or decrease the lightness threshold value applied to the eye regions of the image.

It is noted that other eye color enhancement thresholds and/or parameters may be incorporated as part of the eye color enhancement dialog box 500 of FIG. 5. In this manner, the eye color enhancement dialog box 500 provides its user even more options for specifically controlling the visual enhancement of the eyes of the image. It is appreciated that the eye color enhancement dialog box 500 may be an optional feature that provides users the ability to personalize the eye color enhancement associated with the eyes of the image.

Exemplary Network in Accordance with the Present Invention

Figure 6:
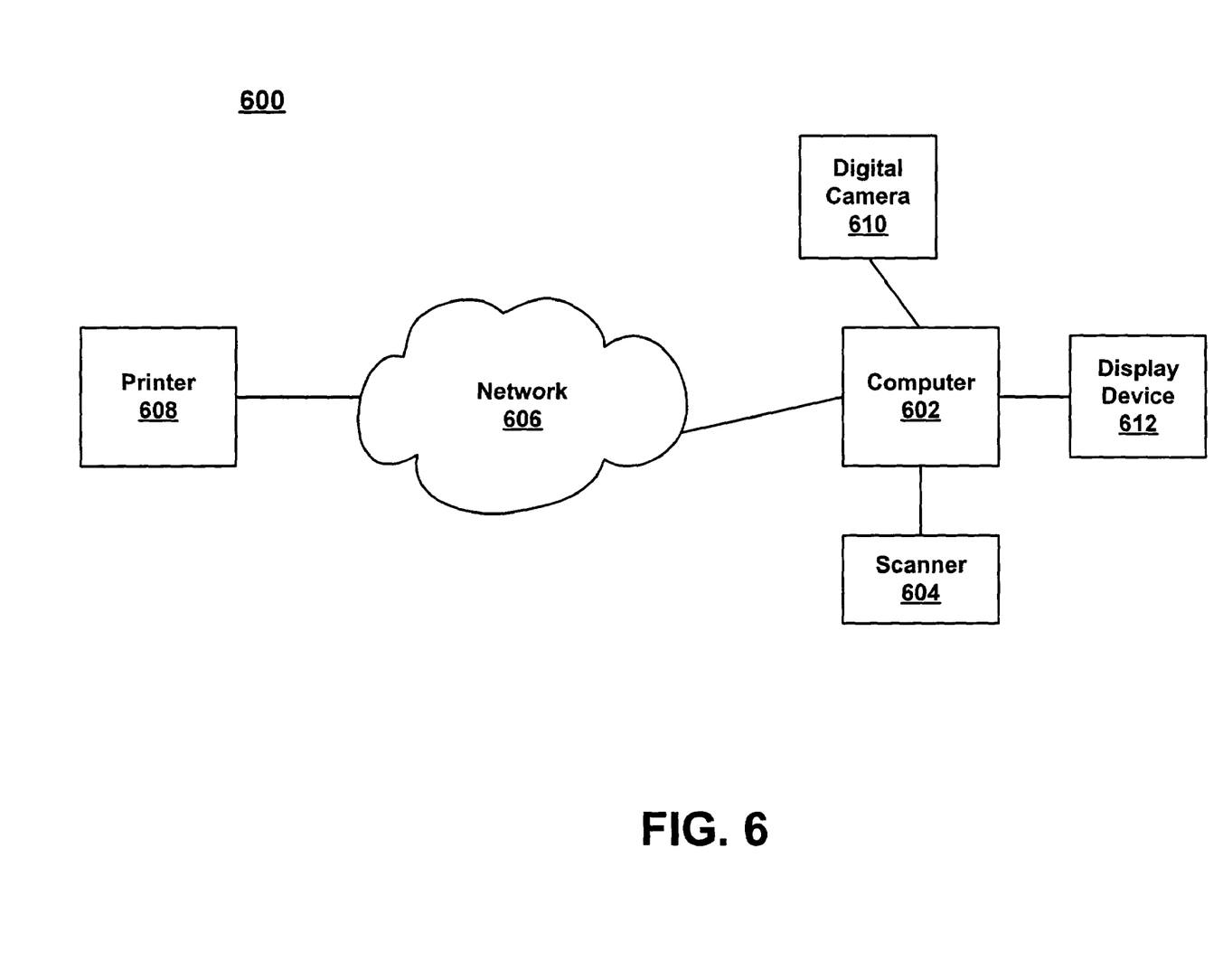
FIG. 6 is a block diagram of an exemplary network that may be utilized in accordance with embodiments of the present invention.

FIG. 6 is a block diagram of an exemplary network 600 that may be utilized in accordance with embodiments of the present invention. Within networking environment 600, a computer 602 may be coupled to, but not limited to, a digital camera 610, an image scanner 604, a display device 612 and a printer 608. Specifically, the computer 602 and the printer 608 are communicatively coupled to network 606. It is appreciated that computer 602 and printer 608 may be communicatively coupled to network 606 via wired and/or wireless communication technologies. In this manner, computer 602 is capacitated to transmit digital images to printer 608 via network 606 for printing.

The network 606 of networking environment 600 may be implemented in a wide variety of ways in accordance with the present embodiment. For example, network 606 may be implemented as, but not limited to, a local area network (LAN), a metropolitan area network (MAN), a wide area network (WAN) and/or the Internet. It is noted that networking environment 600 is well suited to be implemented without network 606. As such, computer 602 may be communicatively coupled to printer 608 via wired and/or wireless communication technologies. Therefore, computer 602 is able to transmit digital images to printer 608 to be printed.

Within FIG. 6, the digital camera 610 and image scanner 604 may be communicatively coupled to computer 602. It is understood that the digital camera 610 and scanner 604 may be communicatively coupled to computer 602 via wired and/or wireless communication technologies. In this fashion, the digital camera 610 and the image scanner 604 are able to transmit digital images to the computer 602. Subsequently, the digital images may be output by computer 602 to be seen on display device 612 by a viewer. Furthermore, the digital images may be output by computer 602 to printer 608 via network 606 to subsequently be printed.

Exemplary Hardware in Accordance with the Present Invention

Figure 7:
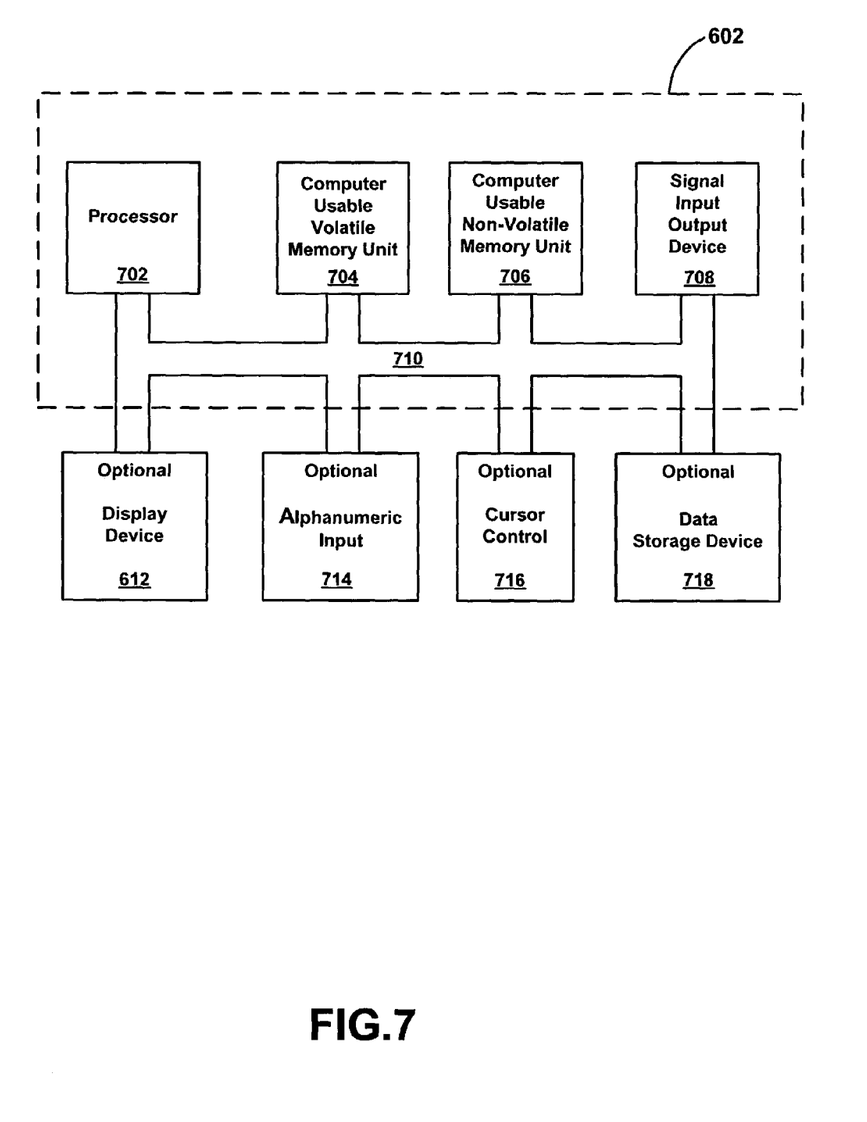
FIG. 7 is a block diagram of an exemplary computer system that may be used in accordance with embodiments of the present invention.

FIG. 7 is a block diagram of an exemplary computer system 602 that may be used in accordance with embodiments of the present invention. It is understood that system 602 is not strictly limited to be a computer system. As such, system 602 of the present embodiment is well suited to be any type of computing device (e.g., server computer, desktop computer, laptop computer, portable computing device, etc.). Within the discussions of the present invention herein, certain processes and steps were discussed that may be realized, in one embodiment, as a series of instructions (e.g., software program) that reside within computer readable memory units of computer system 602 and executed by a processor(s) of system 602. When executed, the instructions cause computer 602 to perform specific actions and exhibit specific behavior which is described herein.

Computer system 602 of FIG. 7 comprises an address/data bus 710 for communicating information, one or more central processors 702 coupled with bus 710 for processing information and instructions. Central processor unit(s) 702 may be a microprocessor or any other type of processor. The computer 602 also includes data storage features such as a computer usable volatile memory unit 704, e.g., random access memory (RAM), static RAM, dynamic RAM, etc., coupled with bus 710 for storing information and instructions for central processor(s) 702, a computer usable non-volatile memory unit 706, e.g., read only memory (ROM), programmable ROM, flash memory, erasable programmable read only memory (EPROM), electrically erasable programmable read only memory (EEPROM), etc., coupled with bus 710 for storing static information and instructions for processor(s) 702.

System 602 also includes one or more signal generating and receiving devices 708 coupled with bus 710 for enabling system 602 to interface with other electronic devices. The communication interface(s) 708 of the present embodiment may include wired and/or wireless communication technology. For example, in one embodiment of the present invention, the communication interface 708 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment a cable or digital subscriber line (DSL) connection may be employed. In such a case the communication interface(s) 708 may include a cable modem or a DSL modem. It is understood that the communication interface(s) 708 may provide a communication interface to the Internet.

Optionally, computer system 602 can include an alphanumeric input device 714 including alphanumeric and function keys coupled to the bus 710 for communicating information and command selections to the central processor(s) 702. The computer 602 can also include an optional cursor control or cursor directing device 716 coupled to the bus 710 for communicating user input information and command selections to the central processor(s) 702. The cursor directing device 716 can be implemented using a number of well known devices such as a mouse, a track ball, a track pad, an optical tracking device, a touch screen, etc. Alternatively, it is appreciated that a cursor can be directed and/or activated via input from the alphanumeric input device 714 using special keys and key sequence commands. The present embodiment is also well suited to directing a cursor by other means such as, for example, voice commands.

The system 602 of FIG. 7 can also include a computer usable mass data storage device 718 such as a magnetic or optical disk and disk drive (e.g., hard drive or floppy diskette) coupled with bus 710 for storing information and instructions. An optional display device 612 is coupled to bus 710 of system 602 for displaying video and/or graphics. It should be appreciated that optional display device 612 may be a cathode ray tube (CRT), flat panel liquid crystal display (LCD), field emission display (FED), plasma display or any other display device suitable for displaying video and/or graphic images and alphanumeric characters recognizable to a user.

Accordingly, embodiments of the present invention provide a way to enable printer drivers to produce more pleasing or attractive renditions of human facial regions location within an image.

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for processing a detected eye of an image to provide visual enhancement, said method comprising:
    performing a face recognition technique to determine whether an eye exists within an image, said eye includes an eye color, said face recognition technique is selected from the group consisting of a Neural Network-Base Face Detection algorithm and a Jones Viola Algorithm;
    if said eye exists within said image, determining the location of said eye within said image; and
    processing said eye to provide visual enhancement to said eye without substantially changing the hue of said eye color of said eye.

2. The method as described in claim 1 wherein said processing said eye to provide visual enhancement to said eye includes increasing or decreasing the chroma of said eye.

3. The method as described in claim 1 wherein said processing said eye to provide visual enhancement to said eye includes increasing or decreasing the saturation of said eye.

4. The method as described in claim 1 wherein said processing said eye to provide visual enhancement to said eye includes increasing or decreasing the lightness of said eye.

5. The method as described in claim 1 wherein said processing said eye to provide visual enhancement to said eye includes increasing or decreasing the colorfulness of said eye.

6. The method as described in claim 1 wherein said processing said eye to provide visual enhancement to said eye includes increasing or decreasing the chroma and lightness of said eye.

7. The method as described in claim 1 wherein said method is performed by a printer driver, image driver or computer.

8. The method as described in claim 1 wherein said image is a digital image.

9. The method as described in claim 1 wherein said determining the location of said eye within said image comprises defining a mask or a bounding box.

10. A system for processing a detected eye region of a digital image that provides visual enhancement, said system comprising:
    means for performing a face recognition technique to determine whether an eye region resides within said digital image, said face recognition technique is selected from the group consisting of a Neural Network-Base Face Detection algorithm and a Jones Viola Algorithm;
    means for ascertaining the location of said eye region within said digital image, in response to said eye region existing within said digital image;
    means for determining whether a color of said eye region exceeds a defined threshold; and
    means for processing said eye region to alter said color of said eye region without significantly changing the hue of said color.

11. The system as described in claim 10 wherein said means for processing includes increasing the chroma of said eye region in response to said color of said eye region being below said defined threshold.

12. The system as described in claim 10 wherein said means for processing includes increasing the saturation of said eye region in response to said color of said eye region being below said defined threshold.

13. The system as described in claim 10 wherein said means for processing includes increasing the lightness of said eye region in response to said color of said eye region being below said defined threshold.

14. The system as described in claim 10 wherein said means for processing includes increasing the chroma and lightness of said eye region in response to said color of said eye region being below said defined threshold.

15. The system as described in claim 10 wherein said means for processing includes decreasing the chroma of said eye region in response to said color of said eye region exceeding said defined threshold.

16. The system as described in claim 10 wherein said means for processing includes decreasing the lightness of said eye region in response to said color of said eye region exceeding said defined threshold.

17. The system as described in claim 10 wherein said means for processing includes decreasing the chroma and lightness of said eye region in response to said color of said eye region exceeding said defined threshold.

18. The system as described in claim 10 wherein said system is associated with a printer driver, digital camera, image scanner or computer.

19. The system as described in claim 10 wherein said defined threshold comprises a threshold range.

20. The system as described in claim 10 wherein said means for processing said eye region to alter said color of said eye region is based on how far said color is from said threshold.

21. A computer readable medium having computer readable code embodied therein for causing a system to process an eye region of an image to provide color enhancement, comprising:

performing a face recognition technique to determine whether a human facial region exists within said image, said face recognition technique is selected from the group consisting of a Neural Network-Base Face Detection algorithm and a Jones Viola Algorithm;

provided said human facial region exists within said image, ascertaining the location of said eye region within said human facial region, said eye region includes a color; and processing said eye region to enhance said color of said eye region of said image without substantially changing the hue of said color.

22. The computer readable medium as described in claim 21 wherein said processing said eye region to enhance said color of said eye region includes increasing the colorfulness of said eye region.

23. The computer readable medium as described in claim 21 wherein said processing said eye region to enhance said color of said eye region includes increasing the chroma of said eye region.

24. The computer readable medium as described in claim 21 wherein said processing said eye region to enhance said color of said eye region includes increasing the saturation of said eye region.

25. The computer readable medium as described in claim 21 wherein said processing said eye region to enhance said color of said eye region includes increasing the lightness of said eye region.

26. The computer readable medium as described in claim 21 wherein said processing said eye region to enhance said color of said eye region includes increasing the colorfulness and lightness of said eye region.

27. The computer readable medium as described in claim 21 wherein said computer readable medium is performed by a printer driver, image driver or computer.

28. The computer readable medium as described in claim 21 wherein said image is a digital image.

29. A computer system comprising:

a processor;

an addressable data bus coupled to said processor; and a memory device coupled to communicate with said processor for performing:

performing a face recognition technique to determine whether a human facial region exists within said image, said face recognition technique is selected from the group consisting of a Neural Network-Base Face Detection algorithm and a Jones Viola Algorithm;

if said human facial region exists within said image, ascertaining the location of said eye region within said human facial region, said eye region includes a color; and processing said eye region to enhance said color of said eye region of said image without substantially changing the hue of said color.

30. The computer system as described in claim 29 wherein said processing said eye region to enhance said color of said eye region includes increasing the colorfulness of said eye region.

31. The computer system as described in claim 29 wherein said processing said eye region to enhance said color of said eye region includes increasing the chroma of said eye region.

32. The computer system as described in claim 29 wherein said processing said eye region to enhance said color of said eye region includes increasing the saturation of said eye region.

33. The computer system as described in claim 29 wherein said processing said eye region to enhance said color of said eye region includes increasing the lightness of said eye region.

34. The computer system as described in claim 29 wherein said processing said eye region to enhance said color of said eye region includes increasing the colorfulness and lightness of said eye region.

35. The computer system as described in claim 29 wherein said image is a digital image.

* * * * *

UNITED STATES PATENT AND TRADEMARK OFFICE
CERTIFICATE OF CORRECTION

| | | |
|---|---|---|
| PATENT NO. | : 7,424,164 B2 | Page 1 of 1 |
| APPLICATION NO. | : 10/420160 | |
| DATED | : September 9, 2008 | |
| INVENTOR(S) | : Jay Gondek et al. | |

It is certified that error appears in the above-identified patent and that said Letters Patent is hereby corrected as shown below:

On the Title Page, Item (56), under "Other Publications", lines 1-3, delete "Henry A. Rowley et al., "Neural Network-Based Face Detection", IEEE. pattern analysis and machine intelligence, vol. 20, No. 1, Jan. 1998.*".

In column 8, line 38, delete "A" and insert -- At --, therefor.

Signed and Sealed this

Thirtieth Day of December, 2008

JON W. DUDAS
*Director of the United States Patent and Trademark Office*